US009745957B2

(12) United States Patent
Seymour et al.

(10) Patent No.: US 9,745,957 B2
(45) Date of Patent: Aug. 29, 2017

(54) SYSTEM AND METHOD FOR INITIALIZING A STARTUP SEQUENCE OF A WIND TURBINE

(71) Applicant: General Electric Company, Schenectady, NY (US)

(72) Inventors: Robert Allen Seymour, Roanoke, VA (US); Anthony Michael Klodowski, Hardy, VA (US); David Smith, Daleville, VA (US); Igor Berroteran Gil, Salem, VA (US); Werner Gerhard Barton, Gescher (DE)

(73) Assignee: General Electric Company, Schenectady, NY (US)

( * ) Notice: Subject to any disclaimer, the term of this patent is extended or adjusted under 35 U.S.C. 154(b) by 586 days.

(21) Appl. No.: 14/202,034

(22) Filed: Mar. 10, 2014

(65) Prior Publication Data

US 2015/0252784 A1    Sep. 10, 2015

(51) Int. Cl.
*B64C 27/00* (2006.01)
*F03D 7/02* (2006.01)
*F03D 9/25* (2016.01)

(52) U.S. Cl.
CPC ............ *F03D 7/026* (2013.01); *F03D 9/255* (2017.02); *Y02E 10/723* (2013.01)

(58) Field of Classification Search
CPC ....... F03D 7/026; F03D 7/0264; F03D 7/0256
USPC .............................................. 416/1; 700/287
See application file for complete search history.

(56) References Cited

U.S. PATENT DOCUMENTS

| | | | |
|---|---|---|---|
| 2007/0024059 A1* | 2/2007 | D'Atre | F03D 7/0272 290/44 |
| 2007/0216165 A1 | 9/2007 | Oohara et al. | |
| 2009/0108582 A1* | 4/2009 | Seibers | F03D 7/02 290/44 |
| 2010/0140937 A1 | 6/2010 | Kirchner et al. | |
| 2011/0144814 A1* | 6/2011 | Menke | F03D 7/026 700/287 |
| 2012/0104758 A1 | 5/2012 | Schietke | |

(Continued)

FOREIGN PATENT DOCUMENTS

DE   102011079269 A1   1/2013

OTHER PUBLICATIONS

European Search Report and Opinion issued in connection with corresponding EP Application No. 15157963 on Jul. 16, 2015.

*Primary Examiner* — Reinaldo Sanchez-Medina
(74) *Attorney, Agent, or Firm* — Dority & Manning, P.A.

(57) ABSTRACT

The present subject matter is directed to a method for initializing a startup sequence of a wind turbine. The method includes a step of defining a plurality of operating conditions of the wind turbine. As such, upon satisfaction of the plurality of operating conditions, a run-ready signal may be generated, wherein the run-ready signal indicates a readiness of a power converter of the wind turbine to generate power. The method may also include defining a subset of the plurality of operating conditions, wherein the subset of operating conditions are independent of speed conditions of the wind turbine. Another step of the method includes generating a spin-ready signal for the wind turbine upon satisfaction of the subset of operating conditions. The method may also include controlling a rotor of the wind turbine based at least in part on the spin-ready signal.

15 Claims, 6 Drawing Sheets

(56) References Cited

U.S. PATENT DOCUMENTS

| | | | |
|---|---|---|---|
| 2013/0022462 A1* | 1/2013 | Lang | G01D 21/00 |
| | | | 416/1 |
| 2013/0277970 A1* | 10/2013 | Dange | F03D 7/0276 |
| | | | 290/44 |
| 2013/0278308 A1 | 10/2013 | Larsen | |
| 2014/0127014 A1 | 5/2014 | Vilbrandt et al. | |

* cited by examiner

SYSTEM AND METHOD FOR INITIALIZING A STARTUP SEQUENCE OF A WIND TURBINE

FIELD OF THE INVENTION

The present subject matter relates generally to wind turbines and, more particularly, to a system and method for initializing a startup sequence of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a nacelle, one or more rotor blades, a gearbox, a generator, and a power converter. The rotor blades capture kinetic energy of wind using known airfoil principles. For example, the wind turbine may include one or more pitch drive mechanisms configured to pitch the rotor blades into the wind. As such, the rotor blades transmit the kinetic energy in the form of rotational energy so as to turn a shaft coupling the rotor blades to a gearbox, or if a gearbox is not used, directly to the generator. The gearbox steps up the inherently low rotational speed of the rotor for the generator to efficiently convert the rotational mechanical energy to electrical energy, which is fed into a utility grid via at least one electrical connection. A power converter is typically used to convert a frequency of a generated electric power to a frequency substantially similar to a utility grid frequency. Conventional wind turbines also typically include a main controller to control various operational modes of the wind turbine.

The controller is typically configured to receive key signals that indicate readiness of the wind turbine to generate power and send commands to the power converter. More specifically, the controller may receive a plurality of signals from the power converter and/or other components of the wind turbine over dedicated interfaces. Such signals may include a "ready-to-run" signal, a "run-ready" signal, a "reactive-power-no-wind (RPNW) run-ready" signal, or similar, all of which indicate the readiness of the wind turbine to produce real or reactive power. It should be understood to those having ordinary skill in the art that such signals may be referred to herein interchangeably. Before the controller commands the power converter to generate power (i.e. run), a predetermined set of conditions must first be satisfied. For example, one of the necessary operating conditions that is required for assertion of the run-ready signal is a predetermined rotor speed, e.g. typically between minimum cut-in speed and a maximum cut-out speed. The inventors determined, however, that much time was wasted by spinning up the rotor to the predetermined speed only to find that one or more other readiness conditions had not been satisfied, thereby preventing the run-ready signal to appear (i.e. preventing startup of the power converter).

Accordingly, a system and method that addresses the aforementioned problems would be welcomed in the technology. For example, a system and method that incorporates a "spin-ready" signal would be advantageous. More specifically, the spin ready signal requires only a subset of the ready-to-run conditions and indicates a high likelihood that spinning-up the rotor will allow the power converter to generate power.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for initializing a startup sequence of a wind turbine. The method includes a step of defining a plurality of operating conditions of the wind turbine. As such, upon satisfaction of the plurality of operating conditions, a run-ready signal may be generated, wherein the run-ready signal indicates the readiness of a power converter of the wind turbine to generate power. The method may also include defining a subset of the plurality of operating conditions, wherein the subset of operating conditions are independent of speed conditions of the wind turbine. Another step of the method includes generating a spin-ready signal for the wind turbine upon satisfaction of the subset of operating conditions. The method may also include controlling, by the one or more processors, a rotor of the wind turbine based at least in part on the spin-ready signal.

In one embodiment, the method may further include the step of, after generating the spin-ready signal, generating the run-ready signal upon satisfaction of the remaining operating conditions within the plurality of operating conditions. Further, the remaining operating conditions may include one or more speed conditions near the wind turbine. For example, in one embodiment, the speed conditions may include at least one of a rotor speed, a generator speed, a wind speed near the wind turbine, or any other speed condition of the wind turbine.

In another embodiment, the subset of operating conditions of the wind turbine may include a first set of conditions that must be asserted to be satisfied (i.e. before the spin-ready signal will be generated). For example, the first set of conditions may include one or more of the following: temperature is acceptable, one or more voltages of a power converter are acceptable, dynamic brake is acceptable, Inter-Process Interface (IPI) is acceptable, converter control unit (CCU) parameters of the one or more processors are ready, a local mode is active, the power converter run is permitted, the power converter start is permitted, a contactor test configuration is acceptable, or similar.

In another embodiment, the subset of operating conditions may further include a second set of operating conditions that must be unasserted to be satisfied (i.e. before the spin-ready signal will be generated). In one embodiment, for example, the second set of operating conditions that must not present (i.e. unasserted) may include one or more of the following conditions: one or more bridge trip faults, a safety chain is open, a stop command is received, a hardware test mode is active, a fast disconnect run inhibit is active, a power converter sequencer is above or beyond a stopped state, or similar. Further, logical combinations, such as logic "and" and logic "or" may be used to form one or more of the conditions, which represents the net state of readiness of the power converter.

In a further embodiment, the step of controlling the rotor of the wind turbine based at least in part on the spin-ready signal may further include at least one of pitching one or more rotor blades of the wind turbine into the wind, via one or more pitch converters, such that the rotor begins to spin and/or releasing a brake of the rotor. In yet another embodiment, the spin-ready signal may be indicative of a likelihood that positioning the rotor in the startup configuration will lead to generating the run-ready signal.

In another aspect, the present subject matter is directed to a method for initializing a startup sequence of a wind turbine. The method includes a step of defining a plurality of operating conditions, wherein the operating conditions are independent of a rotor speed of the wind turbine. The method may further include a step of generating a spin-ready signal for the wind turbine upon satisfaction of the operating conditions. In addition, the method includes controlling a rotor of the wind turbine based at least in part on the spin-ready signal. It should be understood that the method further includes any of the embodiments set forth above.

In still another aspect, the present subject matter is directed to a system for initializing a startup sequence of a wind turbine. The system includes one or more processors and a controller communicatively coupled to the one or more processors. The one or more processors are configured to define a plurality of operating conditions of the wind turbine, wherein upon satisfaction of the plurality of operating conditions, a run-ready signal is generated and indicates a readiness of a power converter of the wind turbine to generate power, define a subset of the plurality of operating conditions, wherein the subset of operating conditions are independent of speed conditions of the wind turbine, and generate a spin-ready signal for the wind turbine upon satisfaction of the subset of operating conditions. The controller is configured to control a rotor of the wind turbine based at least in part on the spin-ready signal.

In another embodiment, the system may also include one or more sensors configured to monitor the plurality of operating conditions of the wind turbine. In still another embodiment, the controller may be further configured to control one or more pitch converters, wherein the pitch converters are configured to pitch one or more rotor blades into the wind such that the rotor begins to spin and/or release a brake of the rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
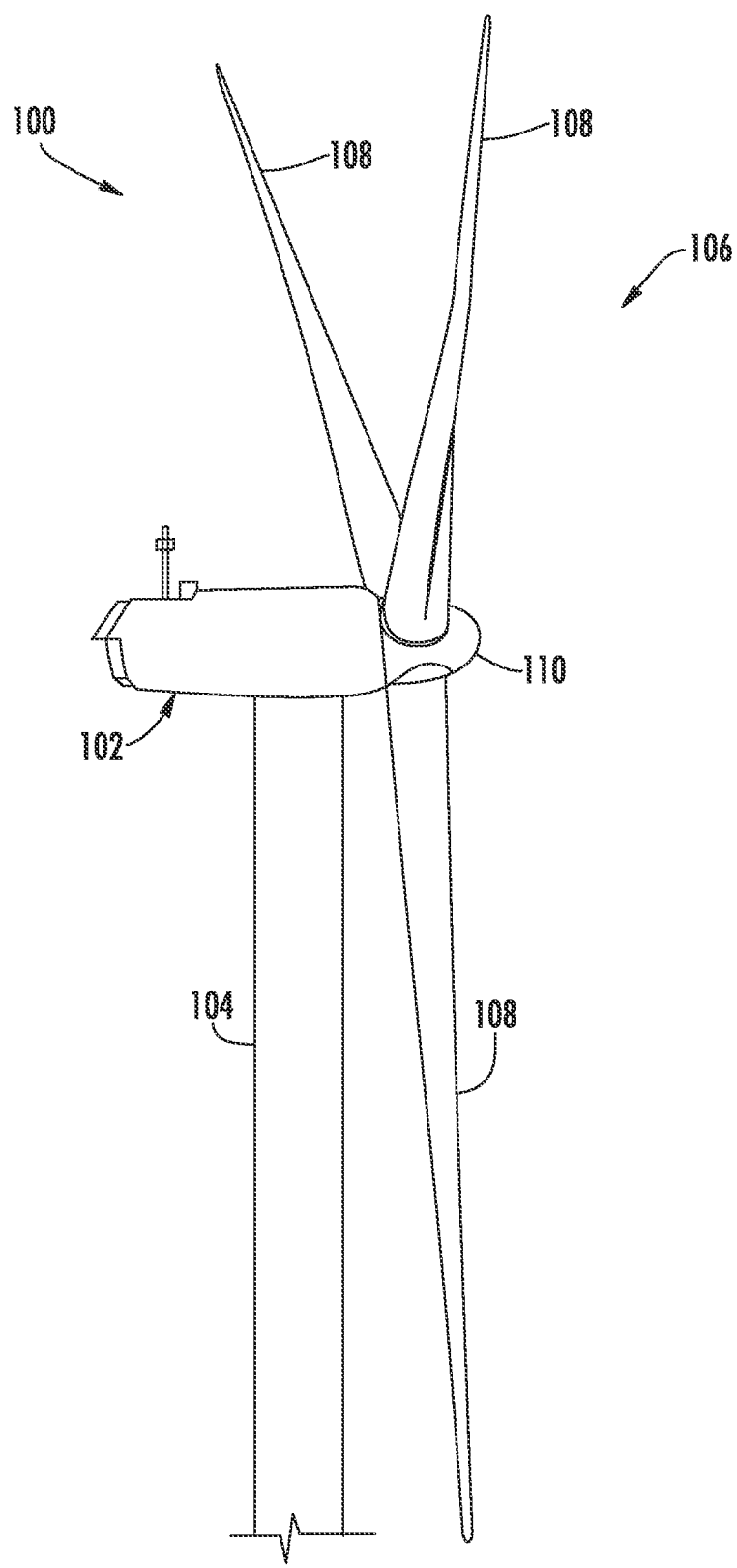
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for initializing a startup sequence of a wind turbine using a spin-ready signal. In one embodiment, for example, the system is configured to define a plurality of operating conditions of the wind turbine required to generate a run-ready signal. As mentioned, the run-ready signal indicates the readiness of a power converter of the wind turbine to respond affirmatively to a command to generate power. An indication of readiness of the power converter is generally understood by those skilled in the art to mean that the power converter logic is satisfied such that the power converter will begin the run sequence in response to a receipt of a run request. In other words, ready signals are generated by the power converter and communicated to the controller. In one embodiment, the run-ready signal is used within the power converter and required for the power converter logic to respond to a run request, which is normally issued by the controller. The system is also configured to define a subset of the plurality of operating conditions of the run-ready signal, wherein upon satisfaction of the subset of operating conditions, the system is configured to generate the spin-ready signal, wherein the spin-ready signal indicates a high likelihood that positioning the rotor in a startup configuration will lead to generating the run-ready signal.

In an alternative embodiment, the operating signals which form the spin-ready signal are not required to be a subset of the run-ready signal. Thus, in one embodiment, the method may include declaring the spin-ready signal as necessary but not a definitive precursor to the run-ready signal. In a further embodiment, the operating conditions required for the spin-ready signal are independent of speed conditions of the wind turbine. In addition, the present subject matter may also include controlling a rotor of the wind turbine based at least in part on the spin-ready signal. For example, the controller may command one or more pitch converters to pitch the rotor blades into the wind or may release a brake of the rotor. In further embodiments, the controller may also be configured to generate the run-ready signal after generating the spin-ready signal, upon satisfaction of the remaining operating conditions within the plurality of operating conditions and/or an additional set of operating conditions.

The present subject matter has many advantages not present in the prior art. For example, conventional run-ready signals require the rotor being up to speed (i.e. the wind speed is between a minimum cut-in speed and a maximum cut-out speed) before the wind turbine will begin generating power. As such, in some instances, the rotor speed is increased regardless of whether other required operating conditions have been satisfied. In the instance where the other operating conditions are not satisfied, much time is wasted spinning up the rotor only to find that the wind turbine is not ready to run. In contrast, the spin-ready signal includes a predetermined subset of the run-ready conditions (i.e. without the speed conditions), which indicate a high likelihood that spinning up the rotor will allow the run-ready signal to appear. As such, the spin-ready signal provides the ability of the controller to specifically indicate readiness of the wind turbine to take the next step in the startup process without requiring complete readiness from the converter. As such, the present subject matter is configured to increase the availability of the wind turbine for opportunities to generate revenue.

Referring now to the drawings, FIG. 1 is a perspective view of a portion of an exemplary wind turbine 100 according to the present disclosure. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
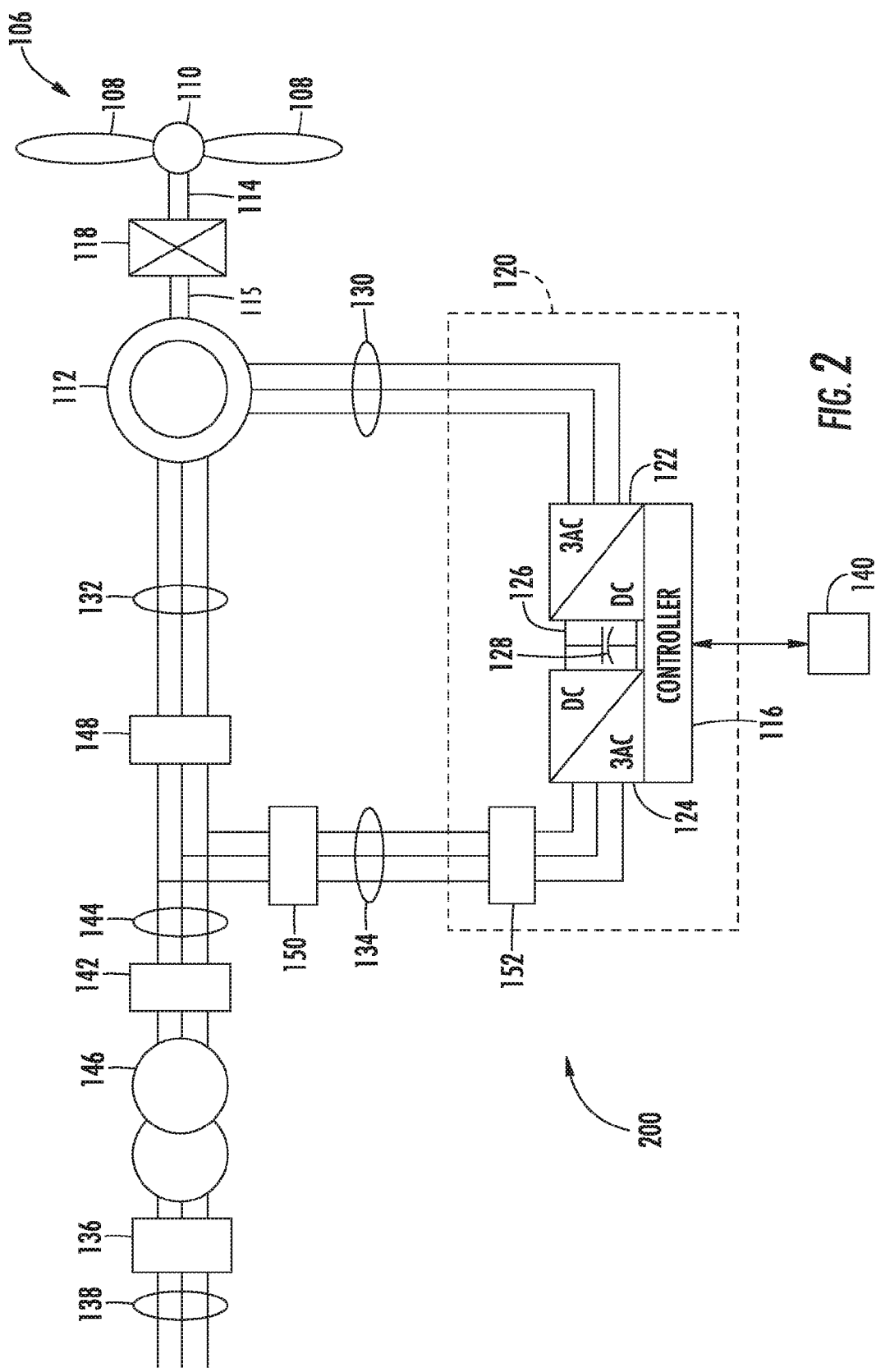
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. As shown, the rotor 106 includes a plurality of blades 108 coupled to the hub 110. During operation, wind impacts the blades 108 and the blades 108 transform kinetic energy from the wind into a mechanical rotational torque that rotatably drives a low-speed shaft 114 via the hub 110, The low-speed shaft 114 is configured to drive a gearbox 118 that subsequently steps up the low rotational speed of the low-speed shaft 114 to drive a high-speed shall 115 at an increased rotational speed. The high-speed shaft 115 is generally rotatably coupled to a generator 112. In accordance with aspects of the present disclosure, the generator 112 may be a wound rotor, three-phase, double-fed induction (asynchronous) generator (DFIG). The generator 112 can be coupled to a stator bus 132 that provides an output multi-phase power (e.g. three-phase power) from a stator of the generator 112, Further, the rotor of the generator 112 can be coupled to a power converter 120 via a rotor bus 130, More specifically, the generator 112 may be coupled via the rotor bus 130 to a rotor-side converter 122, e.g. an inverter 122. The rotor-side converter 122 may be coupled to a line-side converter 124 via a DC link 126 having at least one DC link capacitor 128. Further, the line-side converter 124 may be coupled to a line side bus 134. In one embodiment, the rotor-side converter 122 and the line-side converter 124 may be configured for a normal operating mode in a three-phase, pulse width modulation. (PWM) arrangement using insulated gate bipolar transistor (IGBT) switching elements.

In addition, the power converter 120 can be coupled to a controller 116 to control the operation of the rotor-side converter 122 and the line-side converter 124. It should also be noted that the controller 116 may be configured as an interface between the power converter 120 and a control system 140. The controller 116 can include any number of control devices and can be used to implement the control scheme(s) disclosed herein for controlling any of the wind turbine components described herein or known to those skilled in the art.

In operation, alternating current (AC) power generated at the generator 112 by rotating the rotor 106 is provided via a dual path to the electrical grid 138. The dual paths are on the stator side by the stator bus 132 and on the rotor side by the rotor bus 130. On the rotor side, sinusoidal multi-phase (e.g. three-phase) AC power is provided to the power converter 120. The rotor-side converter 122 converts the AC power provided from the generator 112 into direct current (DC) power and provides the DC power to the DC link 126. Switching elements (e.g. IGBTs) of the rotor-side converter 122 can be modulated to convert the AC power provided from the generator 112 into DC power suitable for the DC link 126.

The line-side converter 124 converts the DC power from the DC link 126 into AC output power suitable for the electrical grid 138. In particular, switching elements (e.g. IGBTs) used in bridge circuits of the line-side power converter 124 can be modulated to convert the DC power on the DC link 126 into AC power on the line side bus 134. The AC power from the power converter 120 can be combined with the power from the stator of the generator 112 to provide multi-phase power (e.g. three-phase power) having a frequency maintained substantially at the frequency of the electrical grid 138 (e.g. 50 Hz/60 Hz).

Various line contactors, circuit breakers and switches, e.g. grid breaker 136, system circuit breaker 142, stator sync switch 148, converter breaker 150, and line contactor 152 can be included in the system 200 to connect or disconnect corresponding buses, for example, when current flow is excessive and can damage components of the wind turbine system 200 and/or for other operational considerations. Further, the system circuit breaker 142 can couple the system bus 144 to a transformer 146, which is coupled to the electrical grid 138 via grid breaker 136. Additional protection components can also be included in the wind turbine system 200.

Figure 3:
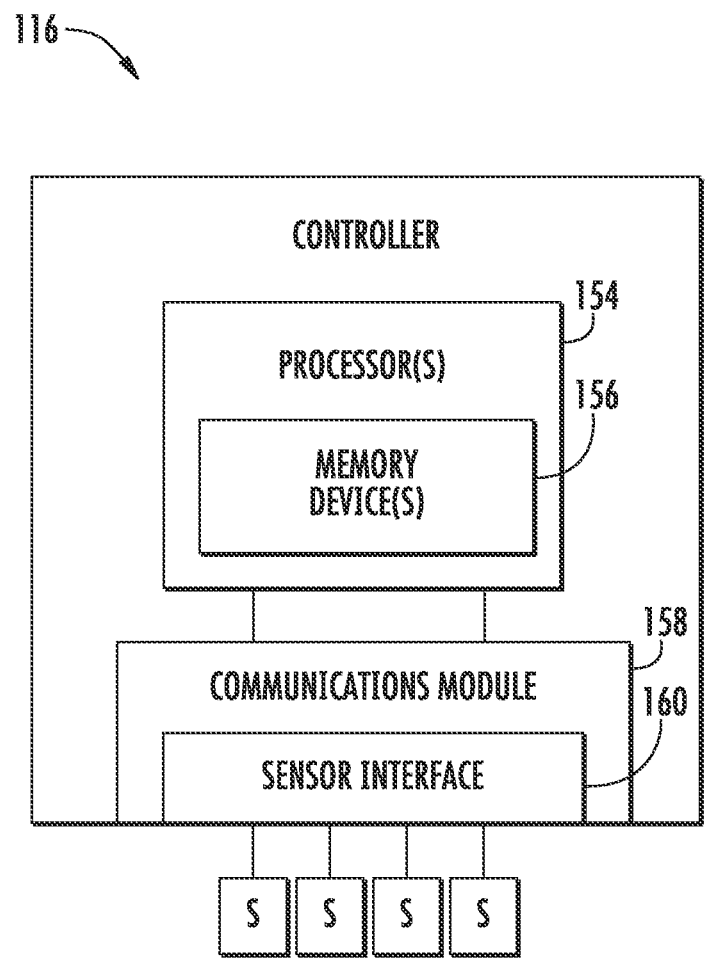
FIG. 3 illustrates a block diagram of one embodiment of a controller suitable for use with the wind turbine shown in FIG. 1.

Still referring to FIG. 2, the power converter 120 can receive control signals from, for instance, the control system 140 via the controller 116. The control signals can be based, among other things, on sensed conditions or operating conditions of the system 200 as monitored by one or more sensors (FIG. 3). Typically, the control signals provide for control of the operation of the power converter 120. For example, feedback in the form of sensed speed of the generator 112 can be used to control the conversion of the output power from the rotor of the generator 112 to maintain a proper and balanced multi-phase (e.g. three-phase) power supply. Other feedback from other sensors can also be used by the controller 116 to control the power converter 120, including, for example, stator and rotor bus voltages and current feedbacks. Using the various forms of feedback information, switching control signals (e.g. gate timing commands for IGBTs), stator synchronizing control signals, and circuit breaker signals can be generated.

Referring now to FIG. 3, various components of the controller 116 of the wind turbine 100 are illustrated. As shown, the controller 116 may include one or more processor(s) 154 and associated memory device(s) 156 configured to perform a variety of computer-implemented functions (e.g., performing the methods, steps, calculations and the like and storing relevant data as disclosed herein). Additionally, the controller 116 may also include a communications module 158 to facilitate communications between the controller 116 and the various components of the wind turbine 100, e.g. any of the components of FIG. 2. Further, the communications module 158 may include a sensor interface 160 (e.g., one or more analog-to-digital converters) to permit signals transmitted from one or more sensors (indicated by "S" in FIG. 3) to be converted into signals that can be understood and processed by the one or more processors 154.

It should be appreciated that the sensors may be communicatively coupled to the communications module 158 using any suitable means. For example, as shown in FIG. 3, the sensors are coupled to the sensor interface 160 via a wired connection. However, in other embodiments, the sensors may be coupled to the sensor interface 160 via a wireless connection, such as by using any suitable wireless communications protocol known in the art. As such, the one or more processors 154 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 156 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the one or more processor(s) 154, configure the controller 116 to perform the various functions as described herein.

As mentioned, the sensors are configured to measure and/or monitor one or more operating conditions of the wind turbine 100. In one embodiment, for example, the sensors include may include one or more of the following: voltage and electric current sensors, blade sensors for measuring a pitch angle of one of the rotor blades 108, generator sensors for monitoring the generator (e.g. torque, rotational speed, acceleration and/or the power output), accelerometer(s), and/or various wind sensor(s) for measuring various wind parameters, such as wind speed, wind peaks, wind turbulence, wind shear, changes in wind direction, air density, temperature, pressure, or similar. Further, the sensors may be located near the ground of the wind turbine, on the nacelle, or on a meteorological mast of the wind turbine.

It should also be understood that any other number or type of sensors may be employed and at any location. For example, the sensors may be a Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 4:
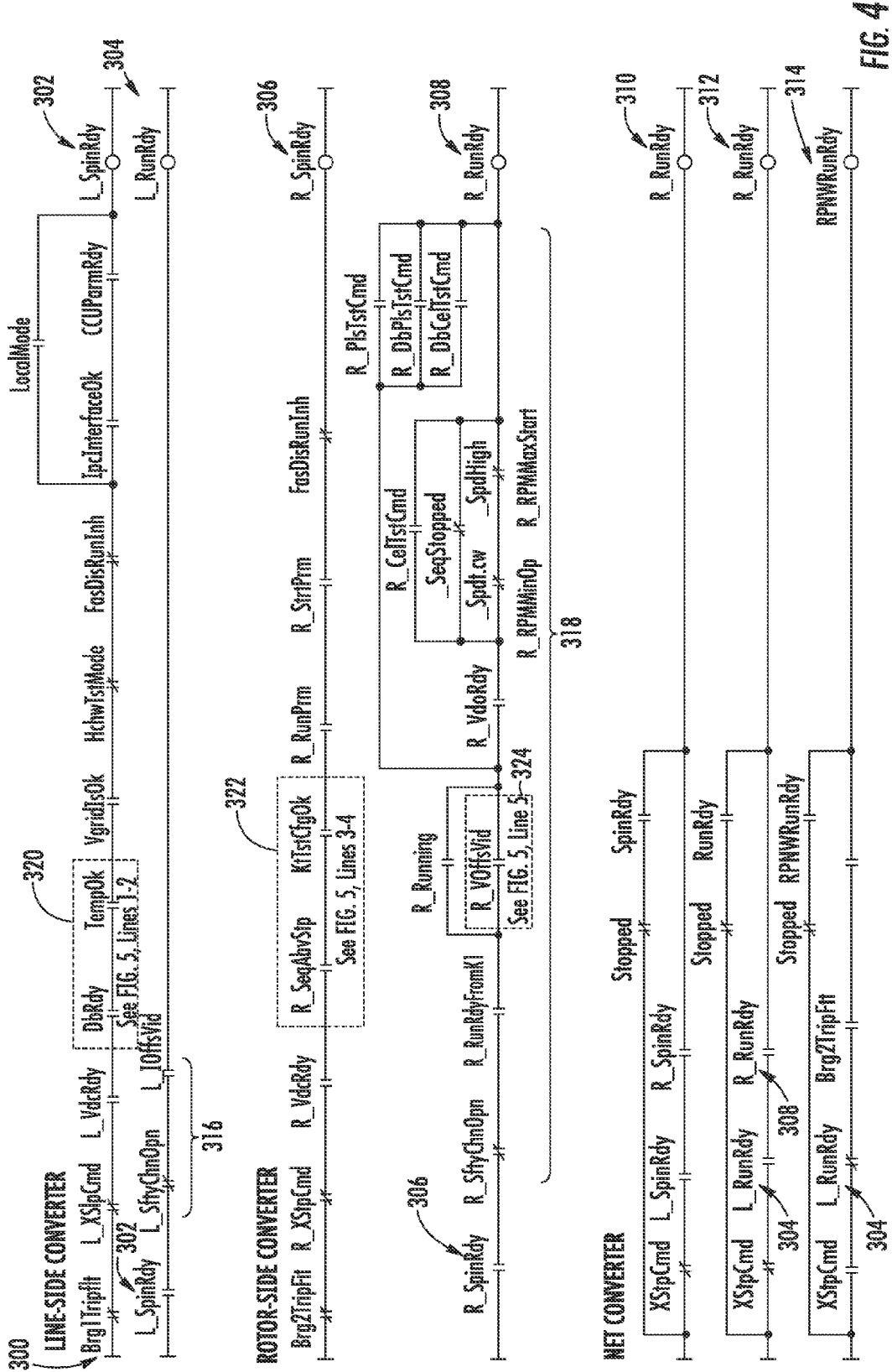
FIG. 4 illustrates a schematic diagram of one embodiment of a permissive logic implemented by one or more processors according to the present disclosure.

Referring now to FIG. 4, there is illustrated a schematic diagram of one embodiment of the permissive logic 300 that may be implemented by one or more processors 154 of the controller 116. It should be understood that the operating conditions may include any of the illustrated signals as well as additional operating conditions known in the art. For example, the operating conditions may include a first set of operating conditions that must be asserted to be satisfied and/or a second set of operating conditions that must be unasserted to be satisfied in order for the controller to generate the spin-ready signal (e.g. SpinRdy). More specifically, in one embodiment, the first set of operating conditions that must be asserted to be satisfied may include one or more of the following conditions: temperature is acceptable, one or more voltages of a power converter are acceptable, dynamic brake is acceptable, Inter-Process Interface (IPI) is acceptable, converter control unit (CCU) parameters of the one or more processors are ready, a local mode is active, the power converter run is permitted, the power converter start is permitted, a contactor test configuration is acceptable, and/or similar. In another embodiment, the readiness of the CCU parameters generally refers to acknowledgement of receipt and/or use of the parameters, needed by the power converter 120, provided by the controller 116. For example, in a particular embodiment, the controller 116 provides rating information to the power converter 120 to determine an appropriate limit for the application of the power converter 120 in the wind turbine 10. In additional embodiments, the second set of operating conditions that must be unasserted to be satisfied may include one or more of the following conditions: a bridge trip faults, a safety chain is open, a stop command is received, a hardware test mode is active, a fast disconnect run inhibit is active, a power converter sequencer is above or beyond a stopped state, and/or similar. To better understand the operating conditions, Tables 1-3 are provided below, which set forth sample operating conditions for various start-up signals, namely, SpinRdy, RunRdy, and RPNWRunRdy, respectively, and the operating condition's corresponding communication to the controller 116.

Referring particularly to Table 1 and FIG. 4, the "L_" that is included as part of some of the condition names is indicative of signals relating to the line-side converter 124. Similarly, the "R_" that is included as part of some of the condition names is indicative of signals relating to the rotor-side converter 122. In one embodiment, the L_SpinRdy signal 302 and the R_SpinRdy signal 306 may require some of the same operating conditions and/or signals. Alternatively, as shown, the L_SpinRdy signal 302 and the R_SpinRdy signal 306 may require different operating conditions and/or signals. For example, in order for the one or more processors 154 to generate the L_SpinRdy signal 302, the following conditions must be asserted to be satisfied: L_VdcRdy, DbRdy, TempOk, VgridIsOk, IpcInterfaceOk and CCUParmRdy, and/or LocalMode, whereas the following conditions must be unasserted to be satisfied: Brg1TripFlt, L_XStpCmd, and HdwTestMode, FastDisRunInh. Similarly, in order for the one or more processors 154 to generate the R_SpinRdy signal 306, the following conditions must be asserted: R_VdcRdy, R_SeqAbvStp, K1TestCfgOk, R_RunPrm, and R_StrtPrm, whereas the following operating conditions must be unasserted: Brg2TripFlt, R_XStpCmd, and FastDisRunInh.

Figure 5:
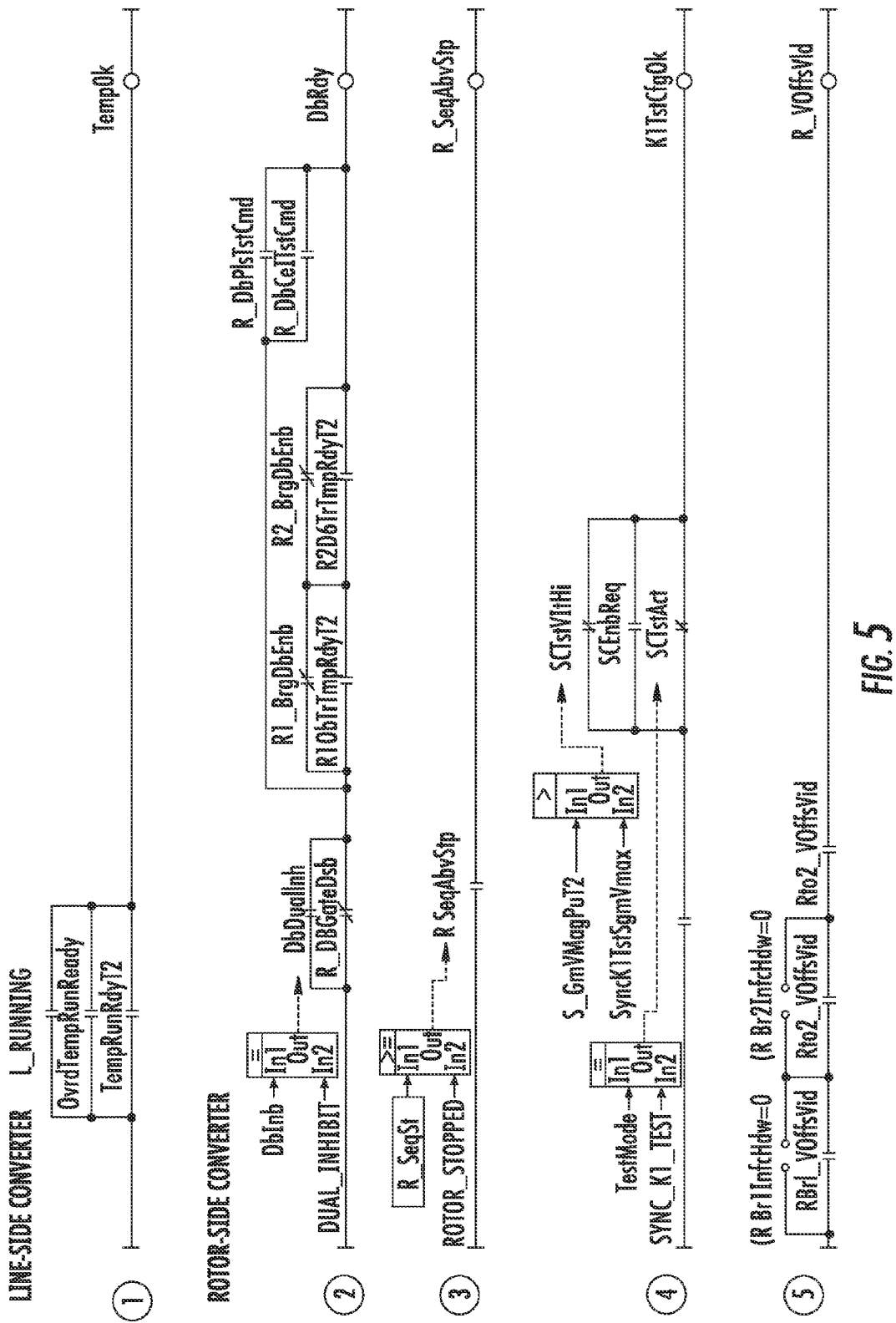
FIG. 5 illustrates a schematic diagram of a portion of the permissive logic of FIG. 4; and, FIG. 6 illustrates one embodiment of a method for controlling a startup sequence of a wind turbine according to the present disclosure.

In addition, as indicated by the dotted boxes 320, 322, 324 in FIG. 4, some of the operating conditions may require one or more additional conditions to be asserted or unasserted. For example, dotted box 320 includes the operating conditions DbRdy and TempOK, the details of which are further shown in FIG. 5. Similarly, dotted boxes 322, 324 include operating conditions R_SeqAbvStp, K1TstCfgOk, and R_VOffVld, respectively, the details of which are also shown in FIG. 5. As shown, additional details and/or signals required for generation of the various operating conditions within the dotted boxes 320, 322, 324 of FIG. 4 are illustrated. For example, in regards to the line-side converter 124, in order for the DbRdy signal to be asserted, the operating conditions of line 2 must also be asserted. In addition, in order for the TempOk signal to be asserted, one of the three signals, namely L_Running, OvrdTempRunRdy, or TempRunRdyT2 must also be asserted (line 1). Further, lines 3, 4, and 5 illustrate one embodiment of the operating conditions required to generate the R_SeqAbvStp, K1TstCfgOk, and R_VOffsVld conditions, respectively.

Once the controller 202 generates the L_SpinRdy signal 302 and the R_SpinRdy signal 306, the one or more processors 154 are configured to generate the overall or net spin ready signal (e.g. SpinRdy 310).

As mentioned, in a particular embodiment, the spin-ready signal described herein is a carefully-selected subset of the run-ready conditions, which indicate a high likelihood that spinning-up the rotor will allow the ready-to-run signal to appear such that the power converter 120 can begin generating power. As such, in one embodiment, the spin-ready signal must be generated (i.e. the subset of operating conditions must be satisfied) before the run-ready signal is generated, thereby providing a more efficient startup sequence of the wind turbine 100. Alternatively, the operating conditions which form the spin-ready signal may not be a subset of the operating conditions required for the run-ready signal, but may be independent of the required run-ready conditions.

TABLE 1

Sample Operating Conditions of the Wind Turbine Required to Generate a Spin Ready Signal (e.g. SpinRdy)

| Operating Signal | Net Ready to Spin (Communicated to Turbine Control) |
| --- | --- |
| XStpCmd | Net STOP command |
| L_SpinRdy | Line-Side Converter Ready to Spin |
| Brg1TripFlt | Bridge 1 Trip Fault |
| L_XStpCmd | Line-Side Converter sensed STOP command |
| VdcIsOk | DC Link Voltage is OK |
| DbRdy | Dynamic Brake is OK |
| TempOk | Temperature is OK |
| VgridIsOk | Grid Voltage is OK |
| HdwTestMode | Hardware Test Mode Active |
| FastDisRunInh | "Fast Disconnect" Run Inhibit Active |
| IpcInterfaceOk | Inter-Process Interface OK |
| CCUParmRdy | CCU Parameters from Turbine Control Ready |
| LocalMode | Local (not Remote) Mode Active |
| R_SpinRdy | Rotor-Side Converter Ready to Spin |
| Brg2TripFlt | Bridge 2 Trip Fault |
| R_XStpCmd | Rotor-Side Converter sensed STOP Command |
| R_VdcRdy | Rotor-Side Converter sensed DC Link Voltage is Ready |
| R_SeqAbvStp | Rotor-Side Converter Sequencer above (beyond) "Stopped" State |
| K1TstCfgOk | K1 Contactor test configuration OK |
| R_RunPrm | Rotor-Side Converter Run Permissive |
| R_StrtPrm | Rotor-Side Converter Start Permissive |
| FastDisRunInh | "Fast Disconnect" Run Inhibit Active |
| Stopped | Line, Rotor, Chopper & Net Sequencer all in "Stopped" State |

Referring particularly to Table 2 and FIG. 4, the one or more processors 154 may also be configured to generate a run-ready signal (e.g. RunRdy 312) for the power converter 120 that indicates that the power converter 120 is ready to respond to a specific command to generate power. For example, as shown in FIG. 4, the overall run-ready signal (e.g. RunRdy 312) includes the run-ready signals for the line-side converter 124 (e.g. L_RunRdy 304) and the rotor-side converter 122 (e.g. R_RunRdy 308). More specifically, the L_RunRdy 304 and R_RunRdy 308 signals each include spin-ready signals, e.g. L_SpinRdy 302 and R_SpinRdy 306, from the line-side converter 124 and the rotor-side converter 122, respectively. Further, the L_RunRdy 304 and R_RunRdy 308 signals each require an additional or remaining set of operating conditions 316, 318, respectively, to be satisfied before the run-ready signals will be generated. For example, as shown, the remaining operating conditions 316, 318 of the plurality of operating conditions may include one or more speed conditions of the wind turbine (e.g. wind speed, rotor speed, namely, R_SpdLow and R_SpdHigh, generator speed, etc.) in addition to various other operating conditions.

TABLE 2

Sample Operating Conditions of the Wind Turbine Required to Generate a Run Ready Signal (e.g. RunRdy)

| Operating Signal | Net Ready to Run (Communicated to Turbine Control) |
| --- | --- |
| XStpCmd | Net STOP command |
| L_RunRdy | Line-Side Converter Ready to Run |
| L_SpinRdy | Line-Side Converter Ready to Spin |
| L_SftyChnOpn | Line-Side Converter Safety Chain Open |
| L_IOffsVld | Line-Side Converter Current Offset Valid |
| R_RunRdy | Rotor-Side Converter Ready to Run |
| R_SpinRdy | Rotor-Side Converter Ready to Spin |
| R_VdcRdy | Rotor-Side Converter sensed DC Link Voltage is Ready |
| R_SftyChnOpn | Rotor-Side Converter Safety Chain Open |
| R_RunRdyFromK1 | Rotor-Side Converter Run Ready from K1 Contactor Logic |
| R_VoffsVld | Rotor-Side Converter Voltage offset Valid |
| R_Running | Rotor-Side Converter Sequencer in "Running" State |
| R_SpdLow | Rotor Speed Low (below cut-in speed) |
| R_SpdHigh | Rotor Speed High (above maximum speed) |
| R_SeqStopped | Rotor-Side Converter sequencer in "Stopped" State |
| R_CelTstCmd | Rotor-Side Converter Cell Test command Active |
| R_PlsTstCmd | Rotor-Side Converter Pulse Test Command Active |
| R_DbCelTstCmd | Rotor-Side Converter DB Cell Test command Active |
| R_DbPlsTstCmd | Rotor-Side Converter DB Pulse Test command Active |
| Stopped | Line, Rotor, Chopper & Net Sequencer all in "Stopped" State |

Referring particularly to Table 3 below, in a further embodiment, the one or more processors 154 may also generate a reactive-power-no-wind (RPNW) run-ready signal (e.g. RPNWRunRdy 314) for the power converter 120, which is an alternative run-ready signal that indicates that the power converter 120 is ready to respond to a specific command to generate power when the wind turbine 100 is standing still due to a lack of wind. As shown, in one embodiment, the RPNWRunRdy signal 314 typically requires the line-side converter 124 run-ready signal (e.g. L_RunRdy 304) to be satisfied. Further, as illustrated, the RPNWRunRdy signal 314 may also require a net "Xstop" command and a bridge trip fault to be false. It should also be understood that any other operating conditions may also be required to generate the RPNWRunRdy signal 314.

TABLE 3

Sample Operating Conditions of the Wind Turbine Required to Generate a RPNM Run Ready Signal (e.g. RPNWRunRdy)

| Operating Signal | Net Ready to Run RPNW Mode (Communicated to Turbine Control) |
| --- | --- |
| XStpCmd | Net "Xstop" Command |
| L_RunRdy | Line-Side Converter Ready to Run |
| Brg2TripFlt | Bridge 2 Trip Fault |
| Stopped | Line, Rotor, Chopper & Net Sequencer all in "Stopped" State |

Figure 6:
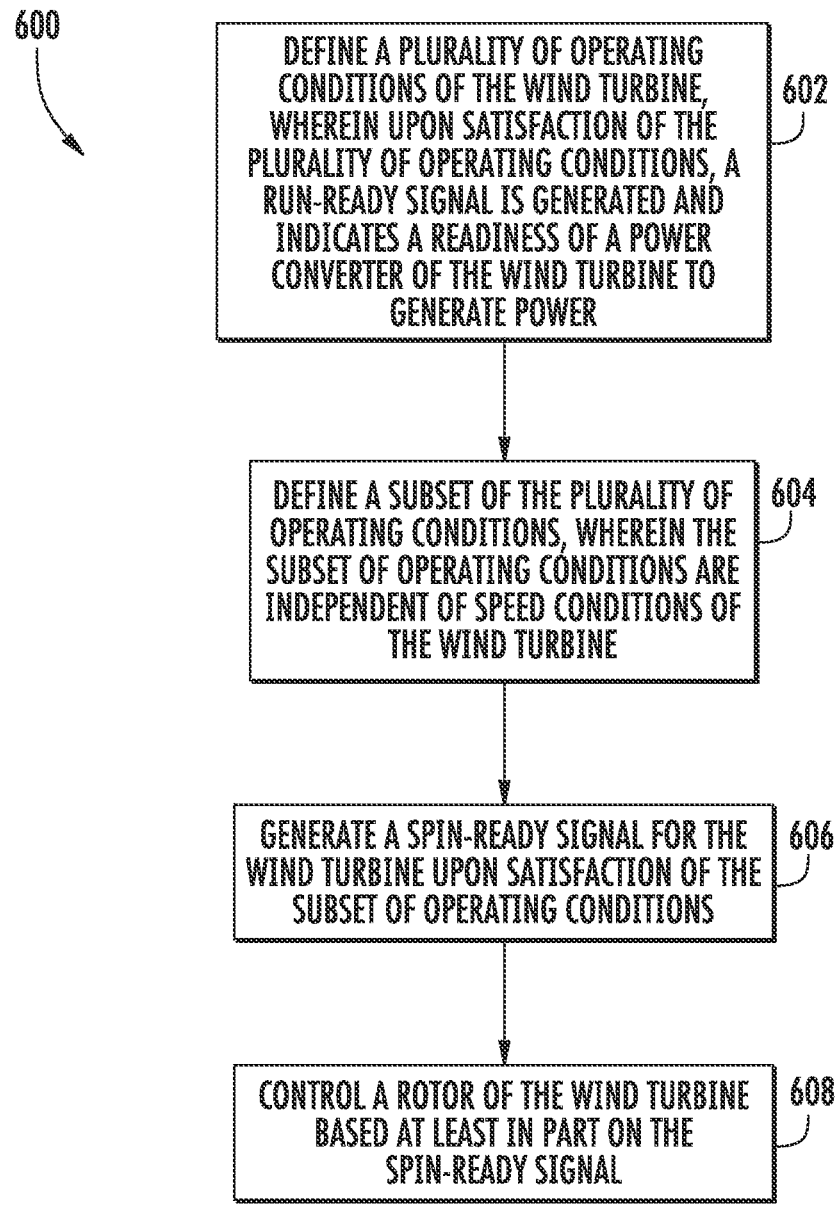

Referring now to FIG. 6, a flow diagram of one embodiment of a method 600 for initializing a startup sequence of a wind turbine 100 according to the present disclosure is illustrated. As shown, the method 600 includes a step of 602 defining a plurality of operating conditions of the wind turbine 100, wherein upon satisfaction of the plurality of operating conditions, a run-ready signal is generated and indicates a readiness of a power converter 120 of the wind turbine 100 to generate power. A next step 304 includes defining a subset of the plurality of operating conditions, wherein the subset of operating conditions are independent of speed conditions of the wind turbine. Further, the method includes generating a spin-ready signal for the wind turbine 100 upon satisfaction of the subset of operating conditions. The method 600 also includes controlling a rotor 106 of the wind turbine 100 based at least in part on the spin-ready signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for initializing a startup sequence of a wind turbine, the method comprising: defining, by the one or more processors, a plurality of speed-dependent operating conditions of the wind turbine, wherein upon satisfaction of the plurality of speed-dependent operating conditions, a run-ready signal is generated and indicates the readiness of a power converter of the wind turbine to generate power; defining, by the one or more processors, a plurality of operating conditions related to the power converter of the wind turbine; generating, by the one or more processors, a spin-ready signal for the wind turbine upon satisfaction of the operating conditions relating to the power converter, the spin-ready signal indicating that positioning a rotor of the wind turbine in a startup configuration will lead to generating the run-ready signal; controlling by the one or more processors, the rotor of the wind turbine based at least in part on the spin-ready signal, and after generating the spin-ready signal, generating the run-ready signal upon satisfaction of the speed-dependent operating conditions.

2. The method of claim 1, wherein the speed-dependent conditions comprise at least one of a rotor speed, a generator speed, or a wind speed near the wind turbine.

3. The method of claim 1, wherein the operating conditions relating to the power converter comprise a first set of conditions that must be asserted to be satisfied, wherein the first set of conditions comprises one or more of the following conditions: temperature is acceptable, one or more voltages of the power converter are acceptable, dynamic brake is acceptable, Inter-Process Interface (IPI) is acceptable, converter control unit (CCU) parameters of the one or more processors are ready, a local mode is active, the power converter run is permitted, the power converter start is permitted, or a contactor test configuration is acceptable.

4. The method of claim 1, wherein the operating conditions relating to the power converter further comprises a second set of operating conditions that must be unasserted to be satisfied.

5. The method of claim 4, wherein the second set of operating conditions comprises one or more of the following conditions: one or more bridge trip faults, a safety chain is open, a stop command is received, a hardware test mode is active, a fast disconnect run inhibit is active, or a power converter sequencer is above or beyond a stopped state.

6. The method of claim 1, wherein controlling the rotor of the wind turbine based at least in part on the spin-ready signal further comprises at least one of pitching one or more rotor blades of the wind turbine into the wind, via one or more pitch converters, such that the rotor begins to spin or releasing a brake of the rotor.

7. A method for initializing a startup sequence of a wind turbine, the method comprising: defining by one or more processors, a plurality of speed-independent operating conditions related to a power converter of the wind turbine, wherein the operating conditions are independent of a rotor speed of the wind turbine; generating, by the one or more processors, a spin ready signal for the wind turbine upon satisfaction of the plurality of speed-independent operating conditions, the spin ready signal indicating that positioning a rotor of the wind turbine in a startup configuration will lead to generating the run-ready signal; controlling, by the one or more processors, the rotor of the wind turbine based at least in part on the spin-ready signal; and generating a run-ready signal upon satisfaction of a plurality of speed-dependent operating conditions after generating the spin-ready signal.

8. The method of claim 7, wherein the speed dependent conditions comprise at least one of a rotor speed, a generator speed, or a wind speed near the wind turbine.

9. The method of claim 7, wherein the plurality of speed-independent operating conditions comprises a first set of conditions that must be asserted to be satisfied, wherein the first set of conditions includes one or more of the following conditions: temperature is acceptable, one or more voltages of the power converter are acceptable, dynamic brake is acceptable, Inter-Process Interface (IPI) is acceptable, converter control unit (CCU) parameters of the one or more processors are ready, a local mode is active, the power converter run is permitted, the power converter start is permitted, or a contactor test configuration is acceptable.

10. The method of claim 7, wherein the plurality of speed-independent operating conditions further comprises a second set of operating conditions that must be unasserted in order for the one or more processors to generate the spin-ready signal.

11. The method of claim 10, wherein the second set operating conditions that must be unasserted comprises one or more of the following conditions: one or more bridge trip faults, a safety chain is open, a stop command is received, a hardware test mode is active, a fast disconnect run inhibit is active, or a power converter sequencer is above or beyond a stopped state.

12. The method of claim 7, wherein controlling the rotor of the wind turbine based at least in part on the spin-ready signal further comprises at least one of pitching one or more rotor blades of the wind turbine into the wind, via one or more pitch converters, such that the rotor begins to spin or releasing a brake of the rotor.

13. A system for initializing a startup sequence of a wind turbine, the system comprising: one or more processors configured to: define a plurality of speed-dependent operating conditions of the wind turbine, wherein upon satisfaction of the plurality of speed-dependent operating conditions, a run-ready signal is generated and indicates the readiness of a power converter of the wind turbine to generate power, define a plurality of speed-independent operating conditions related to the power converter of the wind turbine, generate a spin-ready signal for the wind turbine upon satisfaction of the plurality of speed-independent operating conditions, the spin-ready signal indicating that positioning a rotor of the wind turbine in a startup configuration will lead to generating the run-ready signal; control the rotor of the wind turbine based at least in part on the spin-ready signal; and generate the run-ready signal upon satisfaction of the plurality of speed-dependent operating conditions after generating the spin-ready signal.

14. The system of claim 13, further comprising one or more sensors configured to monitor the plurality of speed-dependent or speed-independent operating conditions of the wind turbine.

15. The system of claim 13, wherein the controller is further configured to control one or more pitch converters of the wind turbine, wherein the pitch converters are configured to pitch one or more rotor blades of the wind turbine such that the rotor begins to spin and release a brake of the rotor.

* * * * *